May 12, 1959
J. A. DERSCH ET AL
2,885,973
SYNCHRONIZING MEANS FOR OVEN CONVEYORS
AND ASSOCIATED HANDLING MECHANISM
Filed Dec. 24, 1954
2 Sheets-Sheet 1
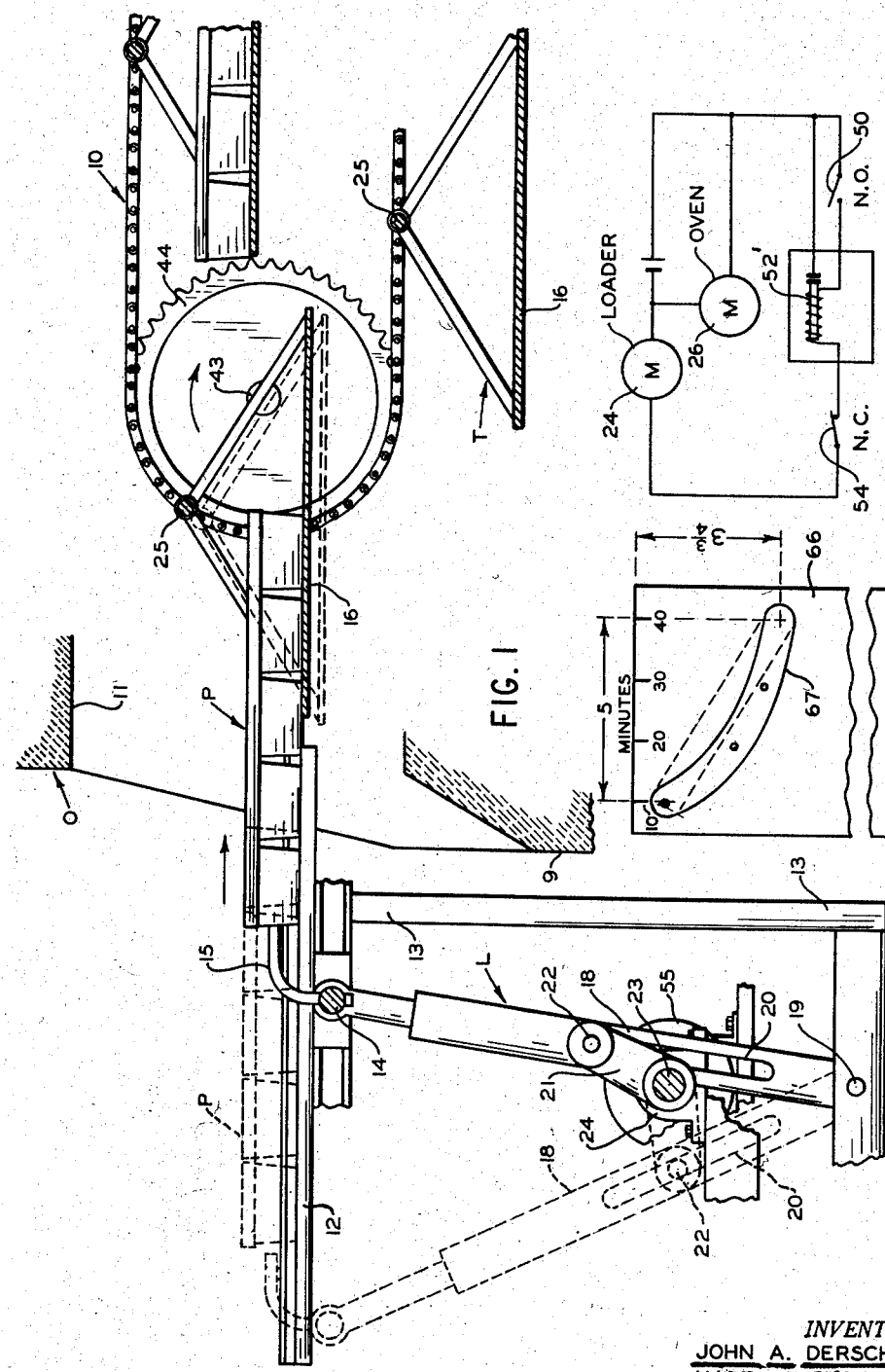
INVENTORS
JOHN A. DERSCH
HARRY G. BURMAN
BY
Learman & Learman.
ATTORNEYS May 12, 1959
J. A. DERSCH ET AL
2,885,973
SYNCHRONIZING MEANS FOR OVEN CONVEYORS
AND ASSOCIATED HANDLING MECHANISM
Filed Dec. 24, 1954
2 Sheets-Sheet 2
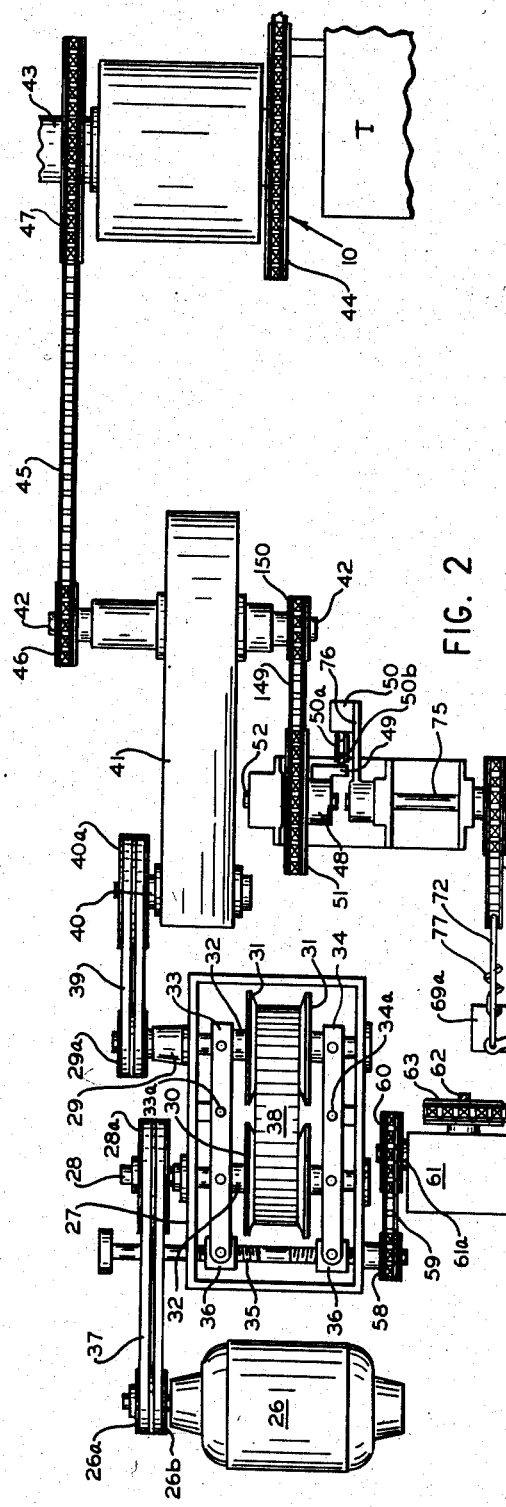
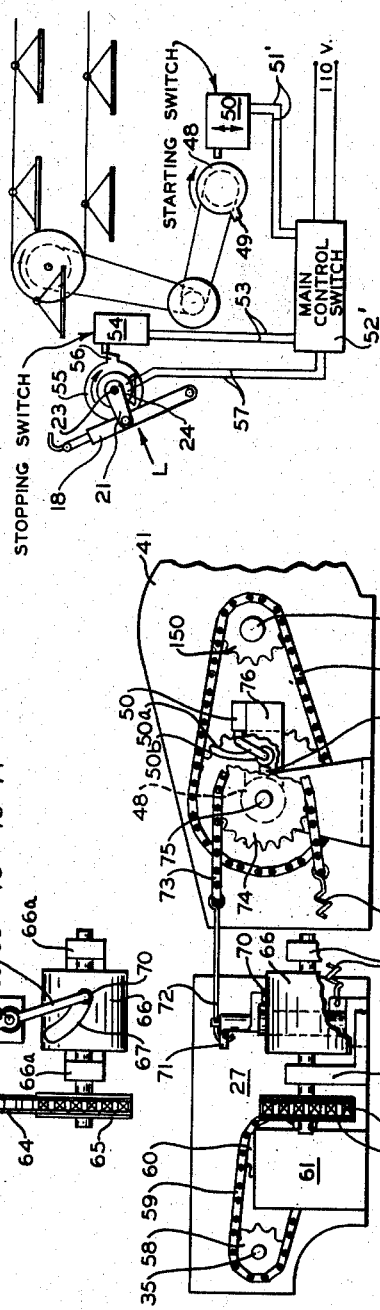
INVENTORS
JOHN A. DERSCH
HARRY G. BURMAN
BY
ATTORNEYS

United States Patent Office 2,885,973
Patented May 12, 1959

2,885,973

SYNCHRONIZING MEANS FOR OVEN CONVEYORS AND ASSOCIATED HANDLING MECHANISM

John A. Dersch and Harry G. Burman, Saginaw, Mich., assignors to Baker Perkins Inc., Saginaw, Mich., a corporation of New York Application December 24, 1954, Serial No. 477,519

13 Claims. (Cl. 107—57)

This invention relates to new and useful improvements in means for synchronizing the operation of an intermittently energized, constant speed, article handling unit with the travel of trays carried by a variable speed tray conveyor in a baking oven.

As is well known in the art, the speed of travel of a commercial baking oven conveyor is varied according to the "bake" time desired for a particular product and consequently the actuation of the constant speed oven loader which operates to load baking pans onto the spaced apart trays carried by the endless oven conveyor, or the oven unloader which unloads the same, must be correlated with the travel of the trays of the conveyor and these elements must be maintained in phase.

In present day installations a timing wheel is conventionally driven from the oven conveyor to actuate a starting switch which energizes a loader, for example, when the oven trays approach loading position, a stopping switch de-energizing the loader when the same has completed a cycle. Such a system will perform satisfactorily within a very narrow range of oven speeds. However, when the speed of the oven is adjusted outside this range, considerable difficulties will be encountered, for while the timing wheel is driven from the oven drive shaft the speed at which the loader operates will not vary and the latter will not, of course, remain in phase with the wheel and trays. When the speed of the oven is increased outside the range the rotation of the timing wheel is correspondingly speeded. However, since the speed of the loader remains the same, the loader will not be started soon enough even so, and the trays will be above the proper level or above the mouth of the oven by the time when the pans are delivered. If the increase in speed is considerable and the particular tray is sufficiently above the pans at the time they are delivered, the latter may jam between the mouth of the oven and the platform of the tray and severely damage the conveyor mechanism. If the tray platform is only slightly above the level of the pans, the latter will be pushed into the end thereof and the shock of impact will cause the proofed dough in the pans to fall. Similarly, when the speed of the oven is decreased below the range mentioned, the rotation of the timing wheel is correspondingly decreased. However, the constant speed loader will be energized to start its cycle too soon despite the slower speed of the timing wheel and the pans will have a "fall" or "drop" to the tray platforms which will similarly cause the proofed dough in the pans to fall.

Accordingly, one of the prime objects of the instant invention is to design a drive system of this type wherein control means is provided for automatically adjusting the position of a starting switch which is tripped by the timing wheel so that the loader or unloader is energized in proper synchronism with the travel of the trays throughout a relatively wide range of oven conveyor speeds.

A further object of the invention is to design a drive system of the type described wherein the intermittent actuation of a loader is so timed with relation to the variable speed of travel of the trays that the fall of the pans from the mouth of the oven to the tray does not exceed a prescribed maximum which does not jar the proofed dough in the pans sufficiently to cause it to fall.

Another object of the invention is to design a variable drive system of the character described wherein the loader or other article handling unit and oven conveyor are driven by independent motors so that problems which would be encountered in providing a common drive for the system do not arise and the oven conveyor can be operated independently of the article handling unit by simply turning off the power supply to the article handling unit motor.

A further object of the invention is to provide synchronizing means for correlating the operation of a loader or article handling unit with the rate of travel of the trays of an oven conveyor which can be very economically installed in existing installations with minor adaptations of an inexpensive nature.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

Fig. 1 is a schematic, side elevational view of an oven and loader mechanism therefor, the broken lines illustrating the rest position of the loader swing arm.

Fig. 2 is a plan view illustrating my variable speed drive system for actuating the oven conveyor and loading mechanism in timed relation.

Fig. 3 is a fragmentary, elevational view thereof showing the means for timing the operation of the loader mechanism.

Fig. 4 is a schematic view of the apparatus illustrating the timing or control circuit.

Fig. 5 shows the electrical circuitry in greater detail.

Fig. 6 is an enlarged plan view of the cam drum shown in Fig. 2.

Referring now more particularly to the accompanying drawings wherein I have shown a preferred embodiment of the invention, a letter O generally designates a baking oven which includes a housing 9 and a continuously moving conveyor 10 extending rearwardly from the mouth 11 of the oven. It is to be emphasized that the mechanism which will be described and claimed can be employed to good advantage with the operating mechanism of ovens and other baking equipment of varying design and that various loading mechanisms or article handling units could be synchronized therewith as desired. A loader L serving the variable speed oven O is shown for purposes of illustration only to demonstrate a function of the invention which is typical of the operation thereof. For the sake of convenience, I have schematically depicted in Fig. 1 the oven loader which is shown and described in Patent No. 2,450,111, issued September 28, 1948 to R. L. Brosemer and which includes a slotted pan supporting table 12 supported by upright frame members 13. A cross bar 14 carries a plurality of upwardly and forwardly curved pusher fingers 15 positioned when in raised position to project up through the slotted table 12 to push the pan sets P from the position shown in broken lines onto the platforms 16 of the oven trays T as shown. The cross bar 14 is carried by swing arms 18 pivoted on both sides of the base of the loader as at 19, the arms being slotted as at 20 and driven by cranks 21 which have crank pins 22 riding in the slots 20. A shaft 23 drives the cranks 21 from an intermittently energized motor 24 and suitable speed reducing means (not shown). When each of the trays T, which are pivotally suspended from the conveyor 10 as at 25 so that the platforms 16 thereof will remain horizontal at all times, reaches the position shown in broken lines in Fig. 1, the loader L is arranged to be energized as hereinafter described and advances forwardly to push the pans onto the tray which has by this time reached the position shown in solid lines and thence retracts to original position and is deenergized. The movement of the loader forwardly and thence its retraction to original position comprises a cycle of movement.

The oven conveyor 10 is driven from a continuously operating motor 26 through a variable speed unit of well known construction which is commonly known as a Reeves drive and includes a housing 27 supporting shafts 28 and 29 on which are mounted the split conical sheaves 30 and 31 respectively. The split sheaves 30 and 31 are mounted on collars 32 which are slidably mounted on said shafts and pivotally connected to levers 33 and 34 in the usual manner. An adjusting shaft 35 which is fixed against axial movement extends through nuts 36 on the ends of the levers 33 and has left hand threads on one end and right hand threads on the opposite end so that upon rotation in the one direction, the outer ends of the levers 33 and 34 which are pivoted at 33a and 34a are spread, and upon rotation in the opposite direction, the outer ends of the levers are closed. A plurality of V-belts 37 trained around pulleys 28a and 26a connect the shaft 28 with the motor shaft 26b and a V-belt 38 is trained around the split sheaves 30 and 31 as usual.

When the shaft 35 is rotated either manually or by motor means (not shown), the speed of the output shaft 29 is increased if the split sheave 31 is spread and the sheave 30 closed and decreased if the sheave 30 is spread and the sheave 31 is closed. From the shaft 29, a plurality of V-belts 39 trained around pulleys 29a and 40a drive the input shaft 40 of a speed reducer 41. The output shaft 42 of the reducer 41 drives the oven conveyor drive shaft 43 on which is mounted one of the oven conveyor sprockets 44. A chain 45 is trained around sprockets 46 and 47 which are mounted on the shafts 42 and 43 respectively.

To energize the intermittently operated loader L, a wheel 48 having a cam 49 thereon is driven from the output shaft 42 of the speed reducer 41, a chain 149 being trained around the sprockets 150 and 51 for driving the shaft 52 on which the wheel 48 is fixed. The cam 49 which is to make a complete revolution between trays, trips a microswitch 50 of well known construction to energize the loader motor 24. The switch 50 has spaced follower arms 50a supporting a roller 50b. In the circuit diagram (see Fig. 4) wires 51' lead to the main control switch 52' from the switch 50 and wires 53 lead from a microswitch 54 which is mounted adjacent a wheel 55 on the loader drive shaft 23. A finger or cam 56 on the wheel 55 is positioned so that it trips the stopping switch 54 when the loader has completed a cycle which obviously occurs on one revolution of the shaft 23. When the starting switch 50 is tripped by the cam 49, the main control switch 52 closes the circuit 57 leading to the motor 24 and when the loader cycle has been completed, the switch 54 is tripped, the circuit 53 is made, and the main control switch 52 breaks the circuit 57 so that the loader comes to rest for a time until the switch 50 is tripped once again.

Since it is frequently desired to change the speed of the oven conveyor 10 to provide a bake time somewhere in the general range of 10 to 40 minutes, it will be apparent that the speed of the conveyor must be changed quite radically. When the speed of the oven conveyor is changed, the speed of the wheel 48 which was timed to the travel of the tray platforms 16 is, of course, correspondingly changed. However, it has been found that because the conveyor approaches loading position at an increased speed while the loader pushing the pans forwardly travels at the previous (constant) speed, the loader will not longer be in phase with the tray platforms 16. Consequently, the loader is either actuated at some time after a tray platform reaches the optimum broken line position in Fig. 1 in which case the dough in the pans will fall due to the impact of the pans striking the end of the tray platform 16, or the loader will be actuated prior to the time the platform reaches this position in which case the trays will be pushed over the edge of the oven opening 11 and will fall to the platform 16, causing the dough to fall due to the impact. It has been determined that the actuation of the loader can be synchronized with the adjusted travel of the trays if the position of the switch 50 is adjusted so that the cam 49 on the wheel 48 will energize the switch circuit either sooner or later, dependent on whether the speed of the oven conveyor has been increased or decreased, and switch controlling means which will now be described is provided for controlling movement of the switch 50. Mounted on the extended end of the adjusting shaft 35 opposite the end which is actuated is a sprocket 58 and a chain 59 trained thereover leads to a sprocket 60 on the input shaft 61a of a speed reducer 61. The output shaft 62 of the reducer 61 has a sprocket 63 with a chain 64 trained thereover which leads to a sprocket 65 on the shaft of a cam drum 66 which is supported in bearings 66a. Provided in the drum 66 is an arcuate cam slot 67 and a lever 68 having a trunnion pivotally supported on a shaft 69 fixed in a block 69a has a follow roller at 70 on one end thereof riding in the slot 67. The opposite upstanding end of the lever 68 has a lug 71 thereon to which is hooked a rod 72 connecting the lever with a chain 73 which is trained around a sprocket 74. The latter sprocket is mounted on a shaft 75 which is in axial alignment with the shaft 52, and rigidly supports the switch 50 on an arm 76. A biasing spring 77 connected to the block 69a and one end of the chain 73 maintains sufficient tension on the chain to keep it taut. When the adjusting shaft 35 is rotated to spread the walls of the split sheave 31 and increase the speed of the oven conveyor 10, the cam drum 66 is revolved forwardly as seen in Fig. 2 through the sprocket 58, chain 59, sprocket 60, reducer 61, sprocket 63, chain 64, and sprocket 65 to adjust the position of the lever 68 so that the latter pulls the chain 73 forwardly and raises the switch 50 a predetermined distance. Thus, the switch 50 will be tripped by the cam 49 sooner than would normally be the case when the speed of the wheel 48 is increased at the time the speed of the conveyor 10 is increased.

Generally speaking the degree of adjustment of the shaft 35 is proportional to the change in speed of the oven conveyor such that the shaft 35 can control the arcuate position of the switch 50 with results which would be satisfactory for handling most materials. It has been found however, that a fall of over two inches when a set of pans containing proofed dough passes beyond its center of gravity and tips toward the tray platforms will in some instances jar the dough sufficiently to cause it to fall. Accordingly the purpose of the slot 67 is to correct the general proportion which exists between turns of the shaft 35 and the increase or decrease in the speed of travel of the oven trays so as to hold the pan fall to a maximum of two inches.

With an oven conveyor which is set to provide a forty minute bake and must also provide a ten minute bake the fall of the set of pans which is negligible at the speed necessary to provide a forty minute bake may be well over two inches at the speed necessary to provide a ten minute bake if no correcting cam slot 67 is provided despite the fact that the invention contemplates the control of the adjustable switch 50 by the adjusting shaft 35. The tray differential between these speeds which is the distance a tray moving with a conveyor whose speed is set to provide a 10 minute bake travels from the point where the switch 50 is tripped to the point where the switch 50 would be tripped if a 40 minute bake was desired, is set up in the following table. The differential is computed by multiplying the faster tray speed in inches per second times the time of the pusher instroke and subtracting the result of the slowest tray travel in inches per second times the time of the pusher instroke which is, of course, constant.

| Baking time (min.) | Tray speed (in./sec.) | Tray differential (in.) | Switch Travel (degrees) |
| --- | --- | --- | --- |
| 40 | .5 | 0 | 0 |
| 30 | .17 | .7 | 8.4 |
| 25 | .8 | 1.2 | 14.4 |
| 20 | 1.0 | 2 | 24 |
| 15 | 1.33 | 3.3 | 39.6 |
| 10 | 2.0 | 6.00 | 72 |

This table is based on a standard oven, with a pusher which has an instroke requiring four seconds to complete, and a four to one Reeves drive whose output shaft travels 1000 r.p.m. for a 10 minute bake and 250 r.p.m. for a forty minute bake. In order to hold the drop to a maximum of two inches for a ten minute bake time it was found that the switch had to travel through an arc of 72° from one extreme position to the other. Whereas the linear cam slot shown in broken lines in Fig. 6 would move the switch 50 through an arc of 72° and maintain the loader and trays in phase at the limits of the switch's travel (for a 40 minute and a 10 minute bake time) it was determined that the cam slot 67 should be arcuate as shown to accelerate the travel of the switch 50 at intermediate points in order to hold to the two inch maximum drop. It was found that optimum results could not be obtained with a linear slot such as shown or with a system in which the adjustment of the shaft 35 was transferred from the speed reduction unit 61 directly to rotation of the shaft 75 by means of a chain trained around the sprocket 63 on the output shaft of the reducer and the sprocket 74 on the shaft 75, because no provision could practically be made for this acceleration factor.

Assuming that a slot 67 in which the total lateral movement is five inches (see Fig. 6) is adequate to revolve the switch 50 through 72 degrees and the revolution of the drum 66 which has a diameter of 6 inches is 3.75 inches of its 18.85 inch circumference to travel the roller 70 from one end of the slot 67 to the other, it is a very simple matter to plot intermediate points on the curve such as the 20 minute and 30 minute bake time points by simple mathematical proportion since the curve of the slot 67 is uniform. The distance of 3.75 inches travel must, of course, be consonant with the speed range of the Reeves drive and the reduction unit 61 must be designed so that maximum adjustment of the shaft 35 from one limit to the other will revolve the drum 66 just 3.75 inches.

In operation when the speed of the oven shaft 43 is decreased, the speed of the wheel 48 will be slowed in proportion therewith. However, the speed of the loader approaching the mouth of the oven 11 will not be slowed to a corresponding degree and the switch 50 must accordingly be adjusted in a counterclockwise direction so that the switch is tripped by the cam 49 somewhat later if the loader is to be maintained in phase with the trays T. To slow the oven, the shaft 35, of course, is rotated in a direction to close the relatively movable end of the sheave 31 and the sprocket 65 is revolved in a counterclockwise direction. The lever 67 is adjusted angularly to cause the shaft 75 to revolve in a clockwise direction and lower the switch 50. Thus, the system is automatically adjusted to maintain the constant speed loader intermittently operating in phase with the travel of the trays approaching the oven mouth and the "drop" is maintained at a predetermined maximum. When it is desired to increase the speed of the oven conveyor again and the shaft 35 is rotated in the opposite direction obviously the drum 66 will revolve in the opposite direction to raise the switch 50. The switch 50 may be a normally open switch which when closed energizes the relay 52' to close its contacts and the circuit through the loader motor 24. When the switch 54 which is normally closed is tripped after the loader has completed a cycle and returned to the position in which it is shown in broken lines in Fig. 1 the circuit through the relay 52' is broken and the relay is spring-returned to original inoperative position. The switch 50 is closed only momentarily and, of course, the switch 54 is opened only momentarily.

It is to be understood that the foregoing is in all cases to be interpreted as illustrative of the invention rather than as limiting the scope thereof, and for a determination of the scope of the invention, attention is directed to the appended claims. It is further to be understood that various equivalent changes may be made in the various elements which comprise the invention without departing from the spirit of the invention or the scope of the claims.

What is claimed is:

1. In a drive system, a motor, a variable speed unit driven by said motor including an output shaft and an adjusting shaft operable to change the speed of said output shaft, an oven conveyor driven from said variable speed unit and carrying article support elements at spaced apart intervals, a constant speed article handling unit moving toward and away from said conveyor in a defined path of movement to meet said elements as they are carried past a predetermined location by said conveyor, a constant speed motor driving said unit, an electric circuit for said motor including movable switch means for starting the latter mentioned motor, and switch means for stopping it when the constant motor speed has completed a cycle of movement, means driven by the output shaft of the variable speed unit for tripping the starting switch means, and means connected to and controlled by the said adjusting shaft for automatically adjusting the position of the movable starting switch means and maintaining the time at which said constant speed unit is started in synchronism with the travel of said elements regardless of a change in the speed of the conveyor such that the constant speed unit reaches the predetermined location at substantially the time an article support element on said conveyor does.

2. In a drive system, a variable speed unit having an output shaft, a motor for driving said unit, means for adjusting the speed of the output shaft, an oven conveyor driven from the output shaft of said variable speed unit, a timing member driven from said variable speed unit, an intermittently operated, constant speed article handling unit associated with said conveyor and moving toward and away therefrom, a motor driving said latter unit, a circuit for said latter motor including a source of power electrically connected to said motor, a switch in said circuit associated with said timing member and tripped by said member to start the motor driving the constant speed unit, means for stopping said latter motor when said unit has completed a cycle of movement to and from said conveyor, and means connected to the said means for adjusting the speed of the output shaft of the speed unit for automatically varying the relative positions of said switch and timing member when the speed of the output shaft of the speed unit is adjusted to change the speed of the conveyor so as to start the intermittently operated motor either earlier or later to compensate for the fact that the speed of said latter motor remains constant while the speed of the conveyor changes.

3. In combination with a baking oven having a mouth for loading bread pans thereinto, a motor, a variable speed unit including a drive sheave and a driven sheave, each having separable conical walls with a V-belt member trained therearound, said unit including also an adjusting shaft connected to said sheaves to separate the walls of the said driven sheave when rotated in one direction and to move the walls thereof together when rotated in the opposite direction, means connecting said motor to said drive sheave for driving same, a substantially horizontally disposed oven conveyor carrying spaced apart trays arranged to travel past the mouth of the oven with the trays in horizontal disposition, means connecting said driven sheave with the oven conveyor to drive the conveyor at an adjustable rate of speed determined by the extent of separation of the walls of the driven sheave, a loader unit arranged adjacent the mouth of the oven having a pusher movable through a substantially horizontal path of travel to and from the oven mouth to load bread pans onto said trays as they are carried past the mouth of the oven, a constant speed motor driving said unit, an electric circuit including a source of power supply for said constant speed motor, a normally closed switch in said circuit stopping said constant speed motor when said unit has moved forwardly to the mouth of said oven to load a tray and returned to original position, a timing shaft driven from the driven sheave of the variable speed unit, a timing wheel on said timing shaft having a cam mounted adjacent the peripheral edge thereof, a second shaft in axial alignment with the timing shaft, a normally open microswitch for starting the constant speed motor in the said circuit and supported on the second shaft, the microswitch including a contact arm disposed in the path of travel of said cam so as to be tripped thereby to make the circuit to and start the constant speed motor, a drum connected to the said adjusting shaft and having a cam slot therein, a lever having a follower on one end thereof riding in said cam slot, and means connecting the opposite end of the lever and the shaft which supports the microswitch, said cam slot being shaped such that the angular position of the microswitch is adjusted in ratio with the adjustment of the adjusting shaft to maintain less than a predetermined distance between the pusher at the end of its forward travel and the oncoming tray.

4. The combination defined in claim 3 in which said slot is curvilinear and the curvature thereof is uniform.

5. The combination defined in claim 3 in which said means for connecting the lever and shaft which supports the microswitch comprises a sprocket on said latter shaft and a chain trained around said sprocket and connected to said lever.

6. The combination defined in claim 5 in which said lever is pivoted on a stationary member and a spring connects one end of said chain with said stationary member and maintains said chain taut.

7. In a drive system, a variable speed unit including an output member and an adjusting shaft for adjusting the speed of the output member of the unit, a motor driving said unit, an oven conveyor having spaced article support elements thereon, said conveyor being driven from the output member of the said unit, a constant speed handling unit having an article handling element movable toward and away from said conveyor, a second motor driving said latter unit, an electric circuit including a source of power supply for said second motor, a switch in said circuit stopping said second motor when the said article handling element has moved toward said oven conveyor and returned to original position, a timing wheel having a trip provided thereon driven from the output member of the variable speed unit, a shaft in axial alignment with said timing wheel, a microswitch supported on said latter shaft in the path of travel of said trip so as to be tripped thereby, said microswitch closing the said circuit and starting the said second motor when engaged by said trip, a revolvable drum driven by the adjusting shaft of the speed unit, the drum having a guide cam provided thereon extending generally in a direction parallel to the axis of the drum, a lever having a follower on one end guided by said cam, and means connecting the opposite end of the lever to the shaft which supports the microswitch to revolve the said latter shaft in accordance with movement imparted to said lever by said cam, said cam being shaped such that the angular position of the microswitch is adjusted in predetermined ratio with the adjustment of the adjusting shaft to maintain less than a prescribed distance between one of the elements on the conveyor and the article handling element of the handling unit when the latter is moved to the conveyor in timed relation relative to the travel of said article support elements on the conveyor past the forward position of the said latter element.

8. In combination, a conveyor including spaced elements carried thereby, a variable speed drive system for said conveyor, adjusting means associated with said drive system for adjusting the output speed thereof as desired and varying the speed of the conveyor, a material handling unit moving toward said conveyor in timed relation to the travel of said elements past a predetermined point and returning therefrom to complete a cycle of movement, means for driving said unit through succeeding cycles of movement at the same speed, and means connected to the means for adjusting the speed of the variable speed drive system varying the time of starting of the said unit toward the conveyor when the speed of the conveyor is changed and automatically compensating for the fact that the speed of travel of the handling unit remains unchanged.

9. In combination, a conveyor including spaced elements associated therewith, a variable speed drive mechanism for said conveyor, an adjusting shaft associated with said mechanism for adjusting the speed at which the mechanism drives the conveyor, a material handling unit moving toward said conveyor in timed relation to the travel of said elements past a predetermined point and returning to complete a cycle of movement, drive means moving said unit through each cycle of movement at the same speed, and means connected to the adjusting shaft correcting the time of starting of the said unit toward the conveyor, when the speed of the conveyor is changed, to compensate for the fact that the speed of travel of the handling unit remains unchanged.

10. In combination, a conveyor including spaced elements carried thereby, a variable speed drive mechanism for said conveyor, a material handling unit moving toward said conveyor in timed relation to the travel of said elements past a predetermined point and returning in a movement cycle, motor means driving said unit through each cycle of movement at the same speed, a rotatable timing member driven from the variable speed drive system and having a trip thereon, an adjustable switch for starting said motor means disposed in the rotary path of said trip, and means for adjusting the position of said switch relative to the timing member and trip when the speed of the conveyor is changed to compensate for the fact that the speed of travel of the handling unit remains unchanged.

11. In combination, a conveyor including spaced elements carried thereby, a variable speed drive system for said conveyor, a material handling unit moving toward said conveyor in timed relation to the travel of said elements past a predetermined point and returning in a movement cycle, motor means driving said unit through each cycle of movement at the same speed, timing means including a rotatable element driven from the variable speed drive system at a speed varying with the speed of the conveyor, switch actuating means associated with the timing means, a switch for starting said motor means, and means having movement independent of the rotation of the timing element for adjusting the relative positions of the switch actuating means and switch when the speed of the conveyor is changed to compensate for the fact that the speed of travel of the handling unit remains unchanged.

12. In combination; an assembly including a motor, a conveyor having spaced article support elements carried thereby, and a variable speed drive system for driving said conveyor; adjusting means associated with said drive system for adjusting the output speed thereof and varying the speed of the conveyor; an article handling unit moving toward said conveyor in timed relation to the travel of said article support elements past a predetermined point and returning therefrom to complete a cycle of movement; a second motor driving said unit through succeeding cycles of movement at the same speed; and timing means including a part driven through the variable speed drive system at a speed varying with the speed of the conveyor, and a second part in the path thereof having movement independent of the travel of said first part for adjusting the relative positions of the parts when the speed of the conveyor is changed; one of said parts being a switch connected to said second motor for starting said second motor and the other being a switch actuator; and means for adjusting the position of said second part when the speed of the conveyor is changed to compensate for the fact that the speed of travel of the said unit remains unchanged.

13. In combination; an assembly including a motor, a conveyor having spaced article support elements carried thereby, and a variable speed drive system for driving said conveyor transmitting the drive motion of said motor to said conveyor; adjusting means associated with said drive system for adjusting the output speed thereof and varying the speed of the conveyor; an article handling unit moving toward said conveyor in timed relation to the travel of said article support elements past a predetermined point and returning therefrom to complete a cycle of movement; a second motor driving said unit through succeeding cycles of movement at the same speed; means for starting said second motor; and control means, having movement independent of the drive motion transmitted by the drive system and cooperable with said means for starting said second motor, for controlling the means for starting said second motor and varying the time of starting of said unit toward the conveyor when the speed of the conveyor is changed to compensate for the fact that the speed of travel of the handling unit remains unchanged.

References Cited in the file of this patent

UNITED STATES PATENTS

| | | |
|---|---|---|
| 1,795,352 | Sundbom | Mar. 10, 1931 |
| 2,450,111 | Brosemer | Sept. 28, 1948 |